2,913,456
INTERMEDIATES FOR THE PRODUCTION OF 19-NORHYDROCORTISONE

Barney J. Magerlein, Kalamazoo, Mich., assignor to The Upjohn Company, Kalamazoo, Mich., a corporation of Michigan No Drawing. Application August 21, 1956
Serial No. 605,409

10 Claims. (Cl. 260—239.55)

This invention relates to steroid chemistry and is more particularly concerned with novel processes for the production of the physiologically active steroid hormone 19-norhydrocortisone from steroids having an aromatic A-ring and to certain novel compounds produced thereby. It is an object of the present invention to provide the novel processes and compounds described herein which are useful in the production of 19-norhydrocortisone. Other objects and uses will be apparent to one skilled in the art.

The process of this invention, illustrated by the following equation wherein $R^1O$ is an ether radical

is a cyclic ketal radical, and AcO is an acyloxy radical, comprises: chemically reducing the A-ring of 3-etherified 3,11β,17α,21 - tetrahydroxy - 19 - nor - 1,3,5(10) - pregnatrien-20-one 20-cyclic ketal (II) with lithium, an alcohol, and liquid ammonia to produce 3-etherified 3,11β,17α,21 - tetrahydroxy - 19 - nor - 2,5(10) - pregnadien-20-one 20-cyclic ketal (III); and hydrolyzing the 3-ether radical and the 20-cyclic ketal radical and isomerizing the 2- and 5(10)-double bonds of the thus-produced diene by reacting with a hydrolyzing agent to produce 11β,17α,21-trihydroxy-19-nor-4-pregnene-3,20-dione, i.e. 19-norhydrocortisone (IV). The conversion of 3-etherified 3,11β,17α,21-tetrahydroxy - 19 - nor - 2,5(10)-pregnadien-20-one 20-cyclic ketal (III) to 19-norhydrocortisone (IV) preferably is accomplished in one step by heating with an acid hydrolyzing agent. This conversion also is accomplished by reacting the 3-etherified 3,11β, 17α,21 - tetrahydroxy - 19 - nor - 2,5(10) - pregnadien-20-one 20-cyclic ketal (III) with an acid hydrolyzing agent at

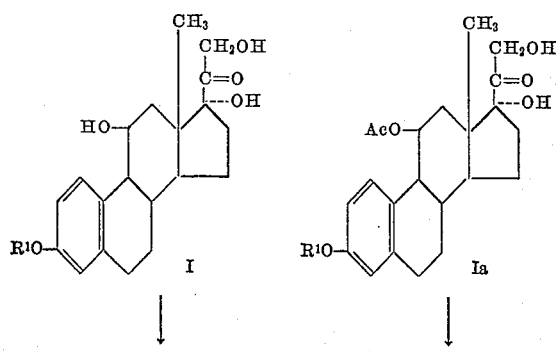

about room temperature to hydrolyze the 3-ether radical and isomerize the 2-double bond and produce 11β,17α,21-trihydroxy-19-nor-5(10)-pregnene-3,20-dione 20 - cyclic ketal (IIIa); reacting the thus-produced 3-keto compound with a base to isomerize the 5(10)-double bond and produce 11β,17α,21-trihydroxy-19-nor-4-pregnene-3,20-dione 20-cyclic ketal (IIIb); and heating the thus-produced 4-pregnene with an acid hydrolyzing agent to hydrolyze the 20-cyclic ketal radical and produced 19-norhydrocortisone (IV).

The starting 3-etherified 3,11β,17α,21-tetrahydroxy-19-nor-1,3,5(10)-pregnatrien-20-one 20-cyclic ketal (II) preferably is obtained by ketalizing the 20-keto group in 3-etherified 3,11β,17α,21-tetrahydroxy-19-nor-1,3,5(10)-pregnatrien-20-one (I) by heating with a glycol in the presence of an acid catalyst. The starting 3-etherified 3,11β,17α,21 - tetrahydroxy - 19 - nor - 1,3,5(10) - pregnatrien-20-one 20-cyclic ketal (II) also is obtained by ketalizing the 20-keto group in 3-etherified 11β-acyloxy-3,17α,21 - trihydroxy - 19 - nor - 1,3,5(10) - pregnatrien- 20-one (Ia) by heating with a glycol in the presence of an acid catalyst followed by reductively hydrolyzing the 11β-acyloxy radical in the thus-obtained 20-cyclic ketal (Ib) with a metal hydride to produce 3-etherified 3,11β,17α,21 - tetrahydroxy - 19 - nor - 1,3,5(10) - pregnatrien-20-one 20-cyclic ketal (II). Both 3-etherified 3,11β,17α,21 - tetrahydroxy - 19 - nor - 1,3,5(10) - pregnatrien - 20-one (I) and the 11β-acyloxy compound thereof (Ia) are obtained as described in our copending application Serial No. 605,411, filed August 21, 1956.

In the processes of the present invention the exact nature of the ether radical (R¹O in the foregoing equation) and acyloxy radical (AcO in the foregoing equation) is immaterial, but generally said ether and acyloxy radicals each contain less than twelve carbon atoms. Preferably said radicals are hydrocarbon acyloxy [hydrocarbon-O-] and hydrocarbon acyloxy $$[\text{hydrocarbon-}\overset{\text{O}}{\underset{\|}{\text{C}}}\text{—O}]$$

radicals, respectively, each containing less than twelve carbon atoms. In an especially preferred embodiment of this invention said radicals are alkoxy and alkanoyloxy radicals, respectively, each containing less than nine carbon atoms. The most preferred embodiment of said radicals are methoxy and acetoxy, respectively. Illustrative ether radicals are methoxy, ethoxy, propoxy, butyroxy, valeroxy, hexoxy, heptoxy, octanoxy, β-trichloro-α-acetylethoxy, chloromethoxy, β-hydroxyethyleneoxy, dimethylmethoxy, diethylmethoxy, isobutyroxy, isovaleroxy, α-tetrahydropyranyloxy, α and β-naphthyloxy, cyclohexyloxy, cyclopentyloxy, β,β-dicarbethoxyethenyloxy, β-ketocyclohexenyloxy, α,β-dimethylethoxy, α,β- and β,β-diethylethoxy, benzoxy, ortho, meta and paratolyloxy, α and β-phenylethyloxy, β-indolyloxy, α-furyloxy, α and β-cyclohexylethyleneoxy, ortho, meta and para-nitrobenzoxy, ortho, meta and para-aminobenzoxy, etc. Illustrative acyloxy radicals are those containing acyl radicals of the acids formic, propionic, butyric, isobutyric, valeric, isovaleric, trimethylacetic, 2-methylbutyric, 3-ethylbutyric, hexanoic, diethylacetic, triethylacetic, heptanoic, octanoic, optically active abietic, α - ethylisovaleric, cyclopropylideneacetic, cyclopentylformic, cyclopentylacetic, α and β-cyclopentylpropionic, cyclohexylformic, cyclohexylacetic, α and β-cyclohexylpropionic, benzoic, 2, 3 or 4-methylbenzoic, 2,3- 2,4-, 2,5-, 2,6-, 3,4-, and 3,5-dimethylbenzoic, ethylbenzoic, 2,4,6-trimethylbenzoic, 2,4,6-triethylbenzoic, α-naphthoic, 3 - methyl - α - naphthoic, phenylacetic, α and β - phenylpropionic, diphenylacetic, triphenylacetic, succinic, glutaric, α-methylglutaric, β-methylglutaric, β,β-dimethylglutaric, adipic, pimelic, suberic, glycolic, lactoic, citric, tartaric, d-maleic, d-glyceric, malonic, gluconic, salicyclic, glycine, diglycollamic, triglycollamic, methylglycine, dimethylglycine, diethylglycine, para-aminosalicylic, para-aminobenzoic, ethylmercaptoacetic, benzylmercaptoacetic, cyanoacetic, chloroacetic, fluoroacetic, trichloroacetic, trifluoroacetic, thioglycolic, 2,3,4-trimethoxybenzoic, α-naphthoxyacetic, β-pyrrolidylpropionic, carbamic acid, phenylcarbamic, n-butylcarbamic dimethylcarbamic, diethylcarbamic, allophanic, β-furylcarboxylic, N-methylpyrrolidyl-2-carboxylic, α-picolinic, indole-2-carboxylic, 6-hydroxyindolyl-3-acetic, N-methylmorpholyl-2-carboxylic, pyrrolyl-2-carboxylic, etc. Likewise the exact nature of the cyclic ketal radicals

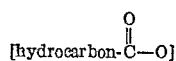

in the foregoing equation) is immaterial, but generally they are α,β- and α,γ-glycol radicals

 and 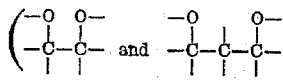

respectively) i.e. are radicals of glycols having less than two carbon atoms between its carbinol radicals

containing less than twelve carbon atoms. Preferably said radicals are hydrocarbon α-glycol radicals containing less than twelve carbon atoms. In an especially preferred embodiment of this invention the cyclic ketal radical is an 1,2-dihydroxyalkane radical containing less than nine carbon atoms. The most preferred cyclic ketal radical is the ethylene glycol radical. Illustrative cyclic ketal radicals are ethylene glycol, 1,2-propylene glycol, trimethylene glycol, 1,2- and 1,3-butylene glycol, tetramethylene glycol, 1,2- and 1,3-pentylene glycol, 1,2- and 1,3-hexylene glycol, 1,2- and 1,3-octylene glycol, 1,2-isobutylene glycol, 1,2-isooctylene glycol, 1,2-dihydroxycyclohexane, 1,2-dihydroxycyclopentane, 1-methyl-2,3-cyclopentanediol, 3-methyl-2,4-hexanediol, 1,2-octadecanediol, 1,2-decanediol, etc.

In carrying out the process of the present invention 3-etherified 3,11β,17α,21-tetrahydroxy-19-nor-1,3,5(10)-pregnatrien-20-one 20-cyclic ketal (II) is chemically reduced by the Birch reduction method with lithium (or sodium), an alcohol (preferably a lower-alkanol containing less than six carbon atoms, e.g. methanol, ethanol, isopropanol, etc.), and liquid ammonia to produce 3-etherified 3,11β,17α,21-tetrahydroxy-19-nor-2,5(10)-pregnadien-20-one 20-cyclic ketal (III), a preferred procedure being given in Example 4. Hydrolyzing and isomerizing 3-etherified 3,11β,17α,21-tetrahydroxy-19-nor-2,5(10)-pregnadien-20-one 20-cyclic ketal (III) to obtain 19-norhydrocortisone (IV) is accomplished in one step (a preferred procedure being given in Example 8) by heating (suitably 65 to 125 degrees centigrade) suitably for fifteen minutes to four hours with an acid hydrolyzing agent, e.g. the preferred fifty percent aqueous acetic acid of Example 8, or other organic acid (e.g. formic acid) or mineral acid (e.g. sulfuric acid) solution of suitable acid strength using, if necessary, an organic solvent (e.g. methanol, ethanol, dioxane, etc.) to obtain a homogeneous reaction solution, the shorter reaction periods and/or lower reaction temperatures usually being preferred when mineral acids are employed. 19-norhydrocortisone (IV) also is produced by the following three-step process. Hydrolyzing and isomerizing the 3-etherified 3,11β,17α,21-tetrahydroxy-19-nor-2,5(10)-pregnadien-20-one 20-cyclic ketal (III) to produce 11β,17α,21-trihydroxy-19-nor-5(10)-pregnene-3,20-dione 20-cyclic ketal is (IIIa) accomplished by reacting with an acid hydrolyzing agent, e.g. dilute aqueous mineral acid (e.g. sulfuric acid), or organic acid of suitable acid strength, suitably at about room temperature (e.g. twenty to forty degrees centigrade) for a reaction period of from fifteen minutes to four hours using, if necessary, an organic solvent (e.g. methanol or ethanol) to obtain a homogeneous solution, a preferred procedure being given in Example 5. Reacting the 11β,17α,21-trihydroxy-19-nor-5(10)-pregnene-3,20-dione 20-cyclic ketal (IIIa) with base, e.g. sodium alkoxide in alcohol, alkali-metal hydroxide in alcohol, etc. suitably at about room temperature (e.g. twenty to forty degrees centigrade) produces 11β,17α,21 - trihydroxy - 19 - nor - 4 - pregnene - 3,20-dione 20-cyclic ketal (IIIb), a preferred procedure being given in Example 6. Hydrolyzing 11β,17α,21-trihydroxy-19-nor-4-pregnene-3,20-dione 20-cyclic ketal by heating with an acid hydrolyzing agent as described previously in the conversion of compound III to compound IV produces 19-norhydrocortisone (IV), a preferred procedure being given in Example 7. The isolation and purification of the compounds of the foredescribed processes is accomplished by conventional procedures as illustrated by Examples 4 through 8.

In producing the starting 3-etherified 3,11β,17α,21- tetrahydroxy-19-nor-1,3,5(10)-pregnatrien-20-one 20-cyclic ketal (II) the ketalization of the 20-keto group in 3-etherified 3,11β,17α,20-tetrahydroxy-19-nor-1,3,5(10)-pregnatrien-20-one (I) by heating with a glycol in the presence of an acid catalyst (e.g. para-toluenesulfonic acid, benzenesulfonic acid, sulfuric acid, etc.) according to conventional prior art procedure is employed, a preferred procedure being given in Example 2. The starting compound II also is prepared by ketalization, as above, of the 20-keto group in 3-etherified 11β-acyloxy-3,17α,21-trihydroxy-19-nor-1,3,5(10)-pregnatrien-20-one (Ia) to produce 3-etherified 11β-acyloxy-3,17α,21-trihydroxy-19-nor-1,3,5(10)-pregnatrien-20-one 20-cyclic ketal (Ib), a preferred procedure being given in Example 1, followed by reductively hydrolyzing the 11β-acyloxy radical in the thus-obtained 20-cyclic ketal with a metal hydride (suitably the preferred lithium aluminum hydride, etc.) using an organic solvent (e.g. ether, dioxane, ether-benzene mixture, etc.) according to conventional prior art procedure and produce 3-etherified 3,11β,17α,21-tetrahydroxy-19-nor-1,3,5(10)-pregnatrien-20-one 20-cyclic ketal (II), a preferred procedure being given in Example 3. The isolation and purification of the compounds of the fore-described processes is accomplished by conventional procedures as illustrated by Examples 1 through 3.

The following examples are illustrative only and are not to be construed as limiting the scope of the present invention.

*Example 1.—3 - methoxy - 11β - acetoxy - 17α,21 - dihydroxy - 19 - nor - 1,3,5(10) - pregnatrien - 20 - one 20 - ethylene ketal*

One gram of 3-methoxy-11β-acetoxy-17α,21-dihydroxy-19-nor-1,3,5(10)-pregnatrien-20-one, fifty milligrams of para-toluenesulfonic acid, and six milliliters of ethylene glycol is dissolved in 75 milliliters of benzene and heated under reflux for seventeen hours. The water formed during the course of the reaction is codistilled with the benzene. The solution then is cooled, washed with dilute aqueous sodium bicarbonate solution, and chromatographed over magnesium silicate (Florisil) using acetone-hexane (Skellysolve B) mixture for elution. The thus-purified product, 702 milligrams, is recrystallized from ethyl acetate to provide 590 milligrams of 3 - methoxy - 11β - acetoxy - 17α,21 - dihydroxy - 19 - nor - 1,3,5(10) - pregnatrien - 20 - one 20 - ethylene ketal, melting point 214 to 218 degrees centigrade. Further recrystallized from ethyl acetate, the compound melts at 218 to 220 degrees centigrade.

*Analysis.*—Calculated for $C_{26}H_{34}O_7$: C, 67.28; H, 7.67. Found: C, 67.15; H, 7.50.

In the same manner other 20-cyclic ketals of 3-etherified 11β - acyloxy - 3,17α,21 - trihydroxy - 19 - nor - 1,3,5(10) - pregnatrien - 20 - ones are prepared by reacting the appropriate glycol with a 3-etherified 11β - acyloxy - 3,17α,21 - trihydroxy - 19 - nor - 1,3,5(10) - pregnatrien - 20 - one, including those wherein the 3-ether radical, 11β-acyloxy radical, and 20-cyclic ketal radical are those specified in the foregoing description.

*Example 2.—3 - methoxy - 11β,17α,21 - trihydroxy - 19 - nor - 1,3,5(10) - pregnatrien - 20 - one 20 - ethylene ketal*

3 - methoxy - 11β,17α,21 - trihydroxy - 19 - nor - 1,3,5(10) - pregnatrien - 20 - one is converted to its 20-ethylene ketal by reaction with ethylene glycol following the procedure of Example 1. The 3 - methoxy - 11β,17α,21 - trihydroxy - 19 - nor - 1,3,5(10) - pregnatrien - 20 - one 20 - ethylene ketal product melts at 179 to 181 degrees centigrade.

In the same manner other 20-cyclic ketals of 3-etherified 3,11β,17α,21 - tetrahydroxy - 19 - nor - 1,3,5(10) - pregnatrien - 20 - ones are prepared by reacting the appropriate glycol with a 3 - etherified 3,11β,17α,21 - tetrahydroxy - 19 - nor - 1,3,5(10) - pregnatrien - 20 - one, including those wherein the 3-ether radical and 20-cyclic ketal radical are those specified in the foregoing description.

*Example 3.—3 - methoxy - 11β,17α,21 - trihydroxy - 19 - nor - 1,3,5(10) - pregnatrien - 20 - one 20 - ethylene ketal*

A solution of 200 milligrams of 3 - methoxy - 11β - acetoxy - 17α,21 - dihydroxy - 19 - nor - 1,3,5(10) - pregnatrien - 20 - one 20 - ethylene ketal in twenty milliliters of benzene is added slowly with stirring to 400 milligrams of lithium aluminum hydride dissolved in 75 milliliters of dry ether. The resulting reaction mixture is stirred for one hour at room temperature (20 to 30 degrees centigrade) and ten milliliters of water then is added cautiously. The organic layer is separated and the solvent evaporated to provide 184 milligrams of crystals. Recrystallization of the crystals from ethyl acetate provides 140 milligrams of 3 - methoxy - 11β,17α,21 - trihydroxy - 19 - nor - 1,3,5(10) - pregnatrien - 20 - one 20 - ethylene ketal, melting point 178 to 180 degrees centigrade, $[\alpha]_D^{24}$ is plus 94 degrees in acetone. The product is identical with the product of Example 2.

*Analysis.*—Calculated for $C_{23}H_{32}O_6$: C, 68.29; H, 7.98. Found: C, 68.48; H, 7.92.

In the same manner other 20-cyclic ketals of 3-etherified 3,11β,17α,21 - tetrahydroxy - 19 - nor - 1,3,5(10) - pregnatrien - 20 - ones are prepared by reductively hydrolyzing a 3 - etherified 11β - acyloxy - 3,17α,21 - trihydroxy - 19 - nor - 1,3,5(10) - pregnatrien - 20 - one 20 - cyclic ketal wherein the 3-ether, 11β-acyloxy, and 20-cyclic ketal radicals are those specified in the foregoing description.

*Example 4.—3 - methoxy - 11β,17α,21 - trihydroxy - 19 - nor - 2,5(10) - pregnadien - 20 - one 20 - ethylene ketal*

A solution of 185 milligrams of 3 - methoxy - 11β,17α,21 - trihydroxy - 19 - nor - 1,3,5(10) - pregnatrien - 20 - one 20 - ethylene ketal in five milliliters of dioxane, 1.5 milliliters of ethanol and thirty milliliters of liquid ammonia is prepared and 150 milligrams of lithium is added in small portions. The ammonia is evaporated and water is added to the residue. Filtration provides 190 milligrams of product melting at 170 to 175 degrees centigrade. Recrystallization of the product from ethyl acetate provides 3 - methoxy - 11β,17α,21 - trihydroxy - 19 - nor - 2,5(10) - pregnadien - 20 - one 20 - ethylene ketal melting at 189 to 197 degrees centigrade.

*Analysis.*—Calculated for $C_{23}H_{34}O_6$: C, 67.95; H, 8.43. Found: C, 67.70; H, 8.60.

Other 3 - etherified 3,11β,17α,21 - tetrahydroxy - 19 - nor - 2,5(10) - pregnadien - 20 - one 20 - cyclic ketals are prepared in the same manner by reducing a 3-etherified 3,11β,17α,21 - tetrahydroxy - 19 - nor - 1,3,5(10) - pregnatrien - 20 - one 20 - cyclic ketal, wherein the 3-ether and 20-cyclic ketal radicals are those specified in the foregoing description.

*Example 5.—11β,17α,21-trihydroxy-19-nor-5(10)-pregnene-3,20-dione 20-ethylene ketal*

A solution of thirty milligrams of 3-methoxy-11β,17α,21-trihydroxy-19-nor-2,5(10)-pregnadien-20-one 20-ethylene ketal in ten milliliters of methanol and one milliliter of 2.5 percent aqueous sulfuric acid solution is maintained at room temperature (e.g. 26 degrees centigrade) for thirty minutes and thereafter neutralized with aqueous potassium bicarbonate solution. The solvent then is partially evaporated and water is added provided 22 milligrams of 11β,17α,21-trihydroxy-19-nor-5(10)-pregnene-3,20-dione 20-ethylene ketal. Recrystallization from acetone provides purified compound melting at 250 to 252 degrees centigrade.

*Analysis.*—Calculated for $C_{22}H_{32}O_6$: C, 67.32; H, 8.22. Found: C, 67.22; H, 8.21.

Other 11β,17α,21-trihydroxy-19-nor-5(10)-pregnene-3,20-dione 20-cyclic ketals are prepared in the same ner by hydrolysis of a 3-etherified 3,11β,17α,21-tetrahydroxy-19-nor-2,5(10)-pregnadien-20-one 20-cyclic ketal wherein the 3-ether and 20-cyclic ketal radicals are those specified in the foregoing description.

*Example 6.—11β,17α,21-trihydroxy-19-nor-4-pregnene-3,20-dione 20-ethylene ketal*

A solution of 55 milligrams of 11β,17α,21-trihydroxy-19-nor-5(10)-pregnene-3,20-ethylene ketal in fifty milliliters of methanol is prepared and forty drops of 2.5 percent sodium methoxide in methanol solution is added. The reaction mixture is maintained at room temperature (e.g. 26 degrees centigrade) under a nitrogen atmosphere for twenty minutes. The solution then is neutralized with dilute sulfuric acid and the solvent evaporated. The residue is extracted with methylene chloride which solution is chromatographed over magnesium silicate (Florisil) using acetone-hexane (Skellysolve B) for elution to provide 35 milligrams for crystalline 11β,17α,21-trihydroxy-19-nor-4-pregnen-3,20-dione 20-ethylene ketal; melting point 225 to 230 degrees centigrade.

In the same manner other 20-cyclic ketals of 11β,17α,21-trihydroxy-19-nor-5(10)-pregnene-3,20-dione are isomized to provide other 20-cyclic ketals of 11β,17α,21-trihydroxy-19-nor-4-pregnene-3,20-dione wherein the 20-cyclic ketal radicals are those specified in the foregoing description.

*Example 7.—19-norhydrocortisone*

Thirty-five milligrams of 11β,17α,21-trihydroxy-19-nor-4-pregnene-3,20-dione 20-ethylene ketal is dissolved in six milliliters of fifty percent aqueous acetic acid solution and heated under reflux for 1.5 hours. The resulting solution is neutralized with potassium bicarbonate and extracted with methylene dichloride. Evaporation of the methylene chloride solvent provides 26 milligrams of 19-norhydrocortisone. Recrystallization from acetone provides purified compound; melting point 250 to 257 degrees centigrade.

*Analysis.*—Calculated for $C_{20}H_{28}O_5$: C, 68.94; H, 8.10. Found: C, 69.21; H, 8.24.

Other 20-cyclic ketals of 11β,17α,21-trihydroxy-19-nor-4-pregnene-3,20-dione, wherein the 20-cyclic ketal radicals are those specified in the foregoing description, are hydrolyzed to 19-norhydrocortisone in the same manner.

*Example 8.—19-norhydrocortisone*

A solution of 428 milligrams of crude 3-methoxy-11β,17α,21-trihydroxy-19-nor-2,5(10)-pregnadien-20-one 20-ethylene ketal in twenty milliliters of fifty percent aqueous acetic acid solution is heated under reflux for one hour. The acid then is neutralized with potassium bicarbonate and the neutralized solution extracted with methylene chloride. Evaporation of the solvent provides 301 milligrams of crude 19-norhydrocortisone. Recrystallization from acetone provides 19-norhydrocortisone melting at 256 to 259 degrees centigrade.

Other 3-etherified 3,11β,17α,21-tetrahdyroxy-19-nor-2,5(10)-pregnadien-20-one 20-cyclic ketals, wherein the 3-ether and 20-cyclic ketal radicals are those specified in the foregoing description, are converted to 19-norhydrocortisone in the same manner.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. 3-etherified 11β-acyloxy-3,17α,21-trihydroxy-19-nor-1,3,5(10)-pregnatrien-20-one 20-cyclic ketal wherein the 3-ether, 11β-acyloxy, and 20-cyclic ketal radicals are alkoxy-alkanoyloxy, and 1,2-dihydroxyalkane radicals, respectively, each containing less than twelve carbon atoms.

2. 3-etherified 3,11β,17α,21-tetrahydroxy-19-nor-1,3,5(10)-pregnatrien-20-one 20-cyclic ketal wherein the 3-ether and 20-cyclic ketal radicals are alkoxy and 1,2-dihydroxyalkane radicals, respectively, each containing less than twelve carbon atoms.

3. 3-etherified 3,11β,17α,21-tetrahydroxy-19-nor-2,5-(10-pregnadien-20-one 20-cyclic ketal wherein the 3-ether and 20-cyclic ketal radicals are alkoxy and 1,2-dihydroxyalkane radicals, respectively, each containing less than twelve carbon atoms.

4. 11β,17α,21-trihydroxy-19-nor-5(10)-pregnene-3,20-dione 20-cyclic ketal wherein the 20-cyclic ketal radical is a 1,2-dihydroxyalkane radical containing less than twelve carbon atoms.

5. 11β,17α,21-trihydroxy-19-nor-4-pregnene-3,20-dione 20-cyclic ketal wherein the 20-cyclic ketal radical is a 1,2-dihydroxyalkane radical containing less than twelve carbon atoms.

6. 3-methoxy-11β-acetoxy-17α,21-dihyrdoxy-19-nor-1,3,5(10)-pregnatrien-20-one 20-ethylene ketal.

7. 3-methoxy-11β,17α,21-trihydroxy-19-nor-1,3,5(10)-pregnatrien-20-one 20-ethylene ketal.

8. 3-methoxy-11β,17α,21-trihydroxy-19-nor-2,5(10)-pregnadien-20-one 20-ethylene ketal.

9. 11β,17α,21-trihydroxy-19-nor-5(10)-pregnene-3,20-dione 20-ethylene ketal.

10. 11β,17α,21-trihydroxy-19-nor-4-pregnene-3,20-dione 20-ethylene ketal.

References Cited in the file of this patent

UNITED STATES PATENTS

| | | |
|---|---|---|
| 2,694,080 | Colton | Nov. 9, 1954 |
| 2,753,342 | Djerassi | July 3, 1956 |

OTHER REFERENCES

Pincus et al.: "The Hormones," vol. III p. 543 Academic Press Inc., New York (1955).